United States Patent [19]

Vincent et al.

[11] 3,925,369

[45] Dec. 9, 1975

[54] NEW TRICYCLIC UREAS PROCESSES FOR THEIR PRODUCTION AND PHARMACEUTICAL COMPOSITIONS

[75] Inventors: Michel Vincent, Bagneux; Georges Remond, Versailles; Michel Laubie, Vaucresson, all of France

[73] Assignee: Science Union et Cie, Societe Francaise de Recherche Medicale, Suresnes, France

[22] Filed: Oct. 31, 1973

[21] Appl. No.: 411,540

[30] Foreign Application Priority Data
Nov. 3, 1972 United Kingdom............... 50697/72

[52] U.S. Cl...... 260/243 A; 260/239 E; 260/239 D; 260/243 B; 260/247.2 A; 260/268 TR; 260/293.59; 260/306.7; 260/307 F; 260/326.34; 260/247.5 R; 260/239 B; 260/293.78; 424/244; 424/246; 424/247; 424/250; 424/267; 424/270; 424/272; 424/274
[51] Int. Cl.²..............C07D 279/36; C07D 223/22; C07D 223/24
[58] Field of Search ... 260/243, 239, 293.59, 326.3, 260/307, 247.2, 302, 268

[56] References Cited
UNITED STATES PATENTS
2,965,638   12/1960   Schindler et al................... 260/239

*Primary Examiner*—Harry I. Moatz
*Attorney, Agent, or Firm*—Omri M. Behr

[57] ABSTRACT

This invention relates to tricyclic compounds bearing on the nitrogen atom of the medium ring an 3-amino 2-hydroxy propylamino carbonyl side chain and their physiologically compatible acid addition salts.

This invention also relates to a process for making the same which includes the steps of condensing a tricyclic carbamic acid or one of its functional derivative with a 1,3-diamino 2-hydroxy propane derivative.

The compounds of the invention have therapeutical utility namely in the cardiovascular field as antiarrythmic agents.

9 Claims, No Drawings

NEW TRICYCLIC UREAS PROCESSES FOR THEIR PRODUCTION AND PHARMACEUTICAL COMPOSITIONS

DESCRIPTION OF THE PRIOR ART

The prior art is illustrated with the U.S. Pat. No. 2,948,718 which relates to (dibenzo azepinyl-5) carbamides and with British Pat. No. 849,032 which relates to N-aminoacyl (dibenzo azepines-5).

SUMMARY OF THE INVENTION

This invention relates to new tricyclic ureas, more particularly to tricyclic compounds having the medium ring including a nitrogen atom which is substituted with a 3-amino 2-hydroxy propylamino carbonyl chain. The other nuclei may carried one or several substituents.

The invention also relates to a process for preparing such tricyclic ureas and to pharmaceutical compositions and methods of treating cardiac diseases using said tricyclic ureas as active ingredients.

This invention relates to urea derivatives and to processes for the manufacture thereof.

The present invention provides a compound of the general formula I:

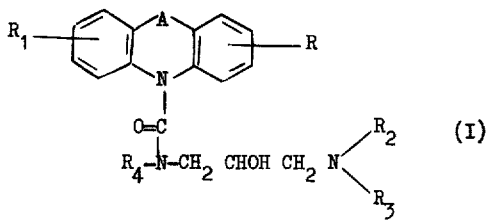

or an acid addition salt, especially a physiologically tolerable acid addition salt, thereof, wherein A represents a $—CH_2—CH_2—$, $—CH=CH—$ or $—S—$ radical, R and $R_1$, which may be the same or different, each represents a hydrogen atom, a halogen atom or a lower alkoxy, trifuoromethyl, lower alkylthio or trifluoromethoxy radical, $R_4$ represents a hydrogen atom or a lower alkyl radical, $R_2$ represents a hydrogen atom, a lower alkyl radical, a lower alkenyl radical or a phenyl lower alkyl radical, $R_3$ represents a lower alkyl radical, a lower alkenyl radical, a lower alkynyl, or a phenyl lower alkyl radical, or, $R_2$ and $R_3$ may be joined together to form with the nitrogen atom to which they are attached a nitrogenous heterocycle having from 3 to 7 links and which may include another hetero atom.

The present invention provides also the acid addition salt thereof with a mineral or organic acid.

As far as the invention is concerned, the term lower alkyl is intended to designate a hydrocarbyl residue having from 1 to 6 carbon atoms in straight or branched chain which may be substituted by an hydroxyl, a lower alkoxy or a dilower alkyl amino group. Examples of such lower alkyl are methyl, ethyl, iso propyl, sec butyl, neo pentyl, terbutyl or n-hexyl.

The term halogen designates preferably fluorine or chlorine. It may be also bromine or iodine.

The term "lower alkenyl" designates a hydrocarbyl residue with one or several double bonds having from 2 to 10 carbon atoms in straight or branched chain. Examples of such alkenyl are allyl, methallyl, isopentenyl, dimethyl allyl, butenyl, triallyl methyl, and the like.

The term phenyl-lower alkyl designates a phenyl -or a substituted phenylbearing a hydrocarbyl residue having from 1 to 6 carbon atoms. The hydrocarbyl residue may be straight or branched chain. The phenyl ring may carry substituent or substituents such as methoxy, trifluoromethyl, halogen, lower alkyl, lower alkylthio and lower acylamino. Examples of such phenyl (lower alkyl) radicals are 3,4-dimethoxy benzyl, benzyl, m-trifluoromethyl benzyl, α-methyl benzyl, p-chlorobenzyl, phenylethyl, phenyl propyl, β-methyl phenylethyl, 2,4-dichlorobenzyl, or 3,5-dimethoxy 4-methyl benzyl.

The term "lower alkynyl" designates a hydrocarbon residue having a triple bond, having from 2 to 6 carbon atoms such as ethynyl, propyn-1 yl, propyn-2 yl or methyl-1 but-2-ynyl.

The nitrogenous heterocycle having from 3 to 7 links may be pyrrolidine, piperidine, aziridine or hexamethylene imine. It may also include an other heteroatom such as a nitrogen atom, a sulfur atom or an oxygen atom. Examples of such heterocycles are oxazolidine, morpholine, thiazolidine, thiamorpholine, piperazine, or homo morpholine. These heterocycles may carry also one or several alkyl residues such as 2,5-dimethyl piperazine.

The present invention also provides as preferred compounds the urea derivatives of the general formula I':

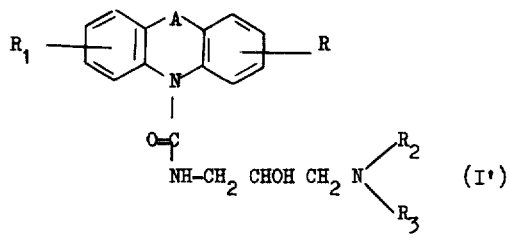

or an acid addition salt, especially a physiologically tolerable acid addition salt, thereof, wherein A, R and $R_1$ are defined as above, $R_2$ represents a hydrogen atom or a phenyl-lower alkyl radical, and $R_3$ represents a lower alkyl radical, or $R_2$ and $R_3$ together represents an alkylene radical having from 2 to 6 carbon atoms the chain of which may be interrupted by an oxygen atom or a sulphur atom.

By the term "lower" used in this particular definition to qualify an organic radical there is meant a radical preferably having from 1 to 5 carbon atoms in a linear or branched chain.

A compound of the formula I has at least one asymmetric carbon atom and, therefore, exists in racemic or optically active forms.

As acid addition salts which are physiologically tolerable there are preferred those with hydrochloric acid, hydrobromic acid, sulphuric acid, phosphoric acid, acetic acid, propionic acid, maleic acid, fumaric acid, tartaric acid, oxalic acid, pyruvic acid, citric acid, benzoic acid, methylsulphonic acid, isethionic acid or glucose-1 phosphoric acid.

The invention provides specifically the following compounds :

dl 5-[(3'-N benzyl N-isopropylamino) 2'-hydroxy propylamino carbonyl] 10,11-dihydro [5H] dibenzo (b,f) azepine and its hydrochloride, dl 5-[3'-N isopropylamino 2'-hydroxy propyl amino carbonyl] 10,11-dihydro [5H] dibenzo (b,f) azepine and its hydrochloride, dl 5-[3'-N' tertbutylamino 2'-hydroxy propylamino carbonyl] 10,11-dihydro [5H] dibenzo (b,f) azepine and its hydrochloride, dl 5-[3'-isopropyl N-benzylamino) 2'-hydroxy propylaminocarbonyl] [5H] dibenzoazepine and its hydrochloride, dl 10-[3'-N tertbutylamino 2'-hydroxy propylamino carbonyl] phenothiazine and its hydrochloride.

The present invention also provides a process for the manufacture of a compound of the general formula I wherein a compound of the general formula II:

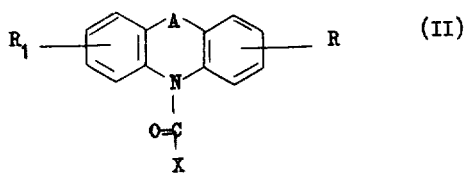
(II)

wherein A, R and $R_1$ have the meanings given above, and X represents a halogen atom, other than a fluorine atom, a lower alkoxy radical or a radical of the formula

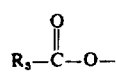

wherein $R_5$ is an organic radical, for example an alkoxy radical, an alkyl radical or a radical of the formula:

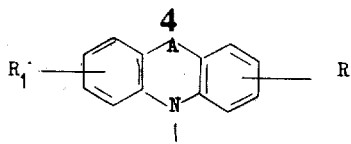

wherein A, R and $R_1$ are defined as above, is reacted with a compound of the general formula III:

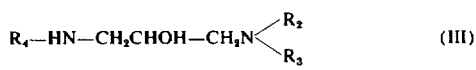
(III)

wherein $R_4$, $R_2$ and $R_3$ have the meanings given above, optionally in the presence of an inert solvent, and separating the compound of the formula I from the reaction mixture. If desired, a compound of the formula I in which $R_2$ represents a hydrogen atom may be obtained from a corresponding compound of the formula I in which $R_2$ represents a phenyl-lower alkyl radical by debenzylation of the latter compound by hydrogenolysis or acidolysis, in order to prevent the possibility of a double condensation.

If desired, the free urea may be salified by the addition of an organic or inorganic acid.

Further, the compound may be resolved into its optical isomers, for example by a method including the step of salification with an optically active carboxylic acid, sulphonic acid or phosphoric acid.

A preferred method of carrying out this process of the invention comprises reacting a compound of the general formula II with a compound of the general formula III in the presence of an inert solvent such as an aromatic hydrocarbon, for example benzene or xylene, a cyclic or non-cyclic ether, for example dioxan, tetrahydrofuran or isopropylether, or a chlorinated compound, for example dichloroethane or methylene chloride, at a temperature preferably within the range of from 35° to 150°C. The reaction may, however, be carried out at or below room temperature in the presence of a catalyst. The process is advantageously carried out in the presence of a basic acid-acceptor, for example trialkylamine, pyridine, 4-dimethylaminopyridine, a dialkylamide, for example dimethylformamide or dimethylacetamide, or a quaternary ammonium hydroxide, for example "Triton B". The reaction may be carried out in the absence of an inert solvent, in which case there is preferably used in excess of the compound of the formula III.

A starting compound of the formula II in which X represents a halogen atom or an alkoxy group may be prepared by reacting a functional derivative of carbonic acid anhydride with a 10,11-dihydro [5H] dibenzo (b,f) azepine, a [5H] dibenzo (b,f) azepine or a phenothiazine. As the functional derivatives the most convenient are phosgene (to form a compound in which X represents a chlorine atom) and an alkylchloroformate (to form a compound in which X represents an alkoxy group).

The carbamic acid chloride obtained when phosgene is used as the functional derivative may be reacted with an alkali-metal salt of the corresponding carbamic acid to form a symmetric anhydride of the formula II, or with an alkali-metal salt of a carboxylic acid or of an alkylcarbonic acid to form a mixed anhydride of the formula II.

A starting compound of the formula II wherein R and/or $R_1$ are lower alkoxy or lower alkylthio groups may, for example, be obtained from the corresponding chloro-derivative by amination of the chlorine atom(s), diazotisation of the amine group(s) by means of a nitrosating agent and conversion of the diazonium group(s) into hydroxyl or thiol group(s) under the Sandmeyer reaction conditions, followed by alkylation of said group(s) in a known manner.

Certain starting materials of the formula II wherein R and/or $R_1$ are trifluoromethoxy groups may, for example, be obtained from m-trifluoromethoxy aniline, by means of known cyclization reactions.

A starting material of the general formula III may for example, be obtained by condensing a compound of the formula VIII:

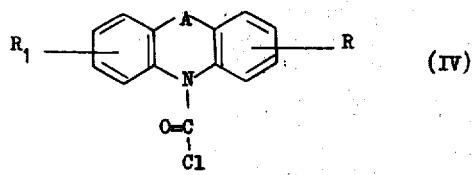
(VIII)

with epichlorohydrin followed by opening of the oxirane with ammonia, using the method described by E. A. Steck in J. of A. Chem. Soc. 70 (1948) 4063.

The present invention also provides a further process for the manufacture of a compound of the general formula I which comprises reacting a compound of the general formula IV:

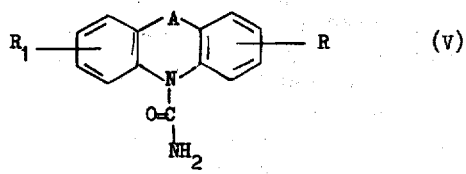
(IV)

wherein A, R and $R_1$ have the meanings given above, with ammonia, whereby there is obtained a compound of the formula V:

(V)

wherein A, R and $R_1$ have the meanings given above and either reacting the compound of the formula V with a compound of the general formula VI:

(VI)

wherein $R_2$ and $R_3$ have the meanings given above and Hal represents a chlorine, bromine or iodine atom, or reacting the compound of the formula V with epichlorohydrin whereby there is obtained a compound the formula VII:

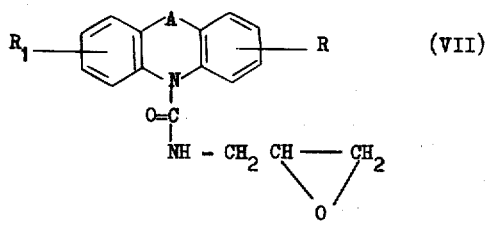
(VII)

wherein A, R and $R_1$ have the meanings given above, and reacting the compound of the formula VII with a compound of the general formula VIII:

wherein $R_2$ and $R_3$ have the meanings given above.

The compounds of the general formula I and physiologically tolerable salts thereof have valuable pharmacological and therapeutic properties, especially very interesting cardiovascular properties, namely antiarrhythmic properties. They find a therapeutic use in the human or veterinary field, for the prevention or treatment of cardiac dysfunction, especially disturbance of cardiac rhythm due to digitalic intoxication or myocardial infarction. They are also useful for the treatment of angina pectoris.

The present invention also provides a pharmaceutical preparation containing, as an active ingredient, a compound of the general formula I, or a physiologically tolerable acid addition salt thereof, in admixture or conjunction with a pharmaceutically acceptable carrier.

A pharmaceutical preparation of the invention is preferably in unit dosage form suitable for oral, parenteral, percutaneous, sublingual or rectal administration. A preparation may, for example, be in the form of an injectable solution or suspension in an ampul, a phial, multi-dose flask or auto-injectable syringe or in the form of a tablet, for example a coated tablet, a gelule, a capsule, drops, a drinkable solution or a granulated powder.

The daily dosage may vary, depending on the method of administration, the therapeutic purpose and the age of the patient; it will, in general, be within the range of from 5 to 500 mg per day, administered in one or more unit doses, the or each dose containing from 1 to 500 mg of said active ingredient.

The present invention also provides a treatment pack containing a compound of the general formula I or a physiologically tolerable acid addition salt thereof together with instructions, the instructions requiring that said compound or salt thereof, preferably in the form of a pharmaceutical preparation of the invention, be administered to a patient one or more times daily for the prevention or treatment of cardiac dysfunction.

The following Examples illustrate the invention:

EXAMPLE 1

5-[3'-(N benzyl N-isopropyl) amino 2'-hydroxypropyl amino-carbonyl]10,11-dihydro [5H ]dibenzo (b,f) azepine and its hydrochloride 5.2 g 3-(N-benzyl N-isopropylamino) 2-hydroxy 1-amino propane are dissolved in 30 ml benzene and this solution is poured slowly into a solution of 6g (10,11-dihydro [5H] dibenzo (b,f) azepinyl-5) carbonyl chloride (obtained by the process described in U.S. Pat. No. 2,794,832) in 30 ml of benzene. The mixture is heated under reflux for five hours, with stirring.

After cooling to room temperature the reaction mixture is extracted with 100 ml of aqueous N-hydrochloric acid.

The aqueous extracts are washed with benzene and are then made alkaline by addition of sodium carbonate.

5[3'-(N-benzyl N-isopropyl) amino 2'-hydroxy propyl-aminocarbonyl] 10,11-dihydro [5H] debenzo (b,f) azepine precipitates and is suction-filtered off-. The precipitate is dissolved in ether and the solution is saturated with an excess of hydrogen chloride and kept acid. The hydrochloric acid addition salt is filtered off under suction and is then washed and dried. Yield 7.6 g (68% of theoretical yield) of white crystals M. Pt. 180° to 181°C.

EXAMPLE 2

5-[3'-N-isopropylamino 2'-hydroxy propylaminocarbonyl] 10,11-dihydro [5H] dibenzo (b,f) azepine and its hydrochloride Using the procedure described in Example 1, starting from 3-N-isopropyl amino 2-hydroxy 1-amino propane and (10,11-dihydro [5H] dibenzo (b,f) azepinyl-5) carbonyl chloride, 5-[3'-N-isopropylamino 2'-hydroxy propylamino carbonyl] 10,11-dihydro [5H] dibenzo (b,f) azepine (hydrochloride) is obtained, with a yield of 62% after recrystallization from acetonitrile (white crystals M. Pt. 202°C).

EXAMPLE 3

5-(3'-N-terbutylamino 2'-hydroxy propylaminocarbonyl) 10,11- dihydro [5H] dibenzo (b,f) azepine and its hydrochloride Using the procedure described in Example 1, starting from 3-terbutyl amino 2-hydroxy 1-amino propane and (10,11-dihydro [5H] dibenzo (b,f) azepinyl-5) carbonyl chloride, 5-[3'-N terbutylamino 2'-hydroxy propylaminocarbonyl ] 10,11-dihydro [5H] dibenzo (b,f) azepine (hydroxhloride) is obtained. Yield 62% of white crystals M. Pt. 249° to 250°C.

EXAMPLE 4

5-[3'-(N-isopropyl N-benzyl) amino 2'-hydroxy propylaminocarbonyl] [5H] dibenzo (b,f) azepine and its hydrochloride Using the procedure described in Example 1, starting from 3-(N-benzyl N-isopropyl) amino 2-hydroxy 1-amino propane and ([5H] dibenzo (b,f) azepinyl-5) carbonyl chloride (obtained as disclosed in U.S. Pat. No. 2,948,718) 5-[3'-(N-isopropyl N-benzyl) amino 2'-hydroxy propyalmino carbonyl[ [5H] dibenzo (b,f) azepine (hydrochloride) is obtained. Yield 71% of white crystals M. Pt. 190° to 191°C.

EXAMPLE 5

10-(3'N-tert-butylamino 2'-hydroxy propylamino carbonyl) phenothiazine and its hydrocloride Using the procedure described in Example 1, starting from phenothiazinyl 10-carbonyl chloride (obtained as described in U.S. Pat. No. 3,070,598) and 3-N- tert-butylamino 2-hydroxy 1-aminopropane, 10-(3'-tert-butylamino 2'-hydroxy propylaminocarbonyl) phenothiazine (hydrochloride) is obtained. Yield 93% of yellowish crystals M. Pt. 248° to 250°C.

EXAMPLE 6

5-[3'-(N-benzyl N-tertbutylamino) 2'-hydroxy propyl amino carbonyl]3,7-dichloro 10,11-dihydro [5H] dibenzo (b,f) azepine.

2,64g of 3,7-dichloro 10,11-dihydro dibenzo (b,f) azepine, prepared according to the process disclosed in British Pat. No. 777,546, are dissolved in 45 ml methylene chloride. To this 2.17g of ethyl chloroformiate and 5 ml triethylamine are added. The mixture is heated to reflux for 3 hours. After return to ambient temperature, the mixture is poured in iced water. The organic phase is succtionned, washed several times with 5 percent hydrochloric acid until the washings will be neutral. Thereafter, the organic phase is discoloured with activated charcoal, filtered, dried on sodium sulphate and filtered again then distillated off.

The residue consisting of ethyl-(3,7-dichloro 10,11-dihydro dibenzo (b,f) azepinyl-5) carbamate is recovered and further purified by recrystallization from isopropyl ether. 1.74g of pure carbamate are thus obtained. The total amount of the latter is dissolved in 20 ml dimethylsulphoxide. Thereafter, 1.50g of 1-amino 3-N-benzyl N-tertbutylamino) 2-propanol and 0.05g of a 50 per cent suspension (in oil) of sodium hydride. The mixture is kept under stirring overnight at room temperature, then poured into iced water under stirring.

5-[(3'-N-benzyl N'-tertburylamino)2'-hydroxy propylamino carbonyl]3,7-dichloro 10,11-dihydro [5H] dibenzo (b,f) azepine precipitates. It is further separated by filtration, washed with much water, dried, washed again with n-pentane and dried under reduced pressure. 2.98g of 5-[(3'-N-benzyl N'-tertbutylamino) 2'-hydroxy propylaminocarbonyl] 3,7-dichloro 10,11-dihydro [5H] dibenzo (b,f) azepine are thus produced.

Using as starting material 1,9-dichloro 10,11-dihydrodibenzo (b,f) azepine and 3-N-benzyl N-isopropylamino) 1-amino 2-propanol under similar conditions, 5-[3'-(N'-benzyl N'-isopropylamino 2'-hydroxy propylaminocarbonyl ] 1,9-dichloro 10,11-dihydro [5H] dibenzo (b,f) azepine is produced with an over-all yield of 47%.

EXAMPLE 7

Using similar experimental conditions as in example 1 starting from 6g of (10,11-dihydro [5H] dibenzo (b,f) azepinyl-5) carbonyl chloride and 3.51g of 3-N-morpholino 1-amino 2-propanol there are 8.02g of 5(3'-N-morpholino 2'-hydroxypropylaminocarbonyl) 10,11-dihydro [5H] dibenzo (b,f) azepine which are recovered.

In the same fashion using N-piperidino 2-hdyroxy 1-aminopropane as starting material, 5-(3'-N-piperidino 2'-hydroxy propylamino carbonyl) 10,11-dihydro [5H] dibenzo (b,f) azepine is produced.

In the same fashion using as starting materials 3-diallylamino 2-hydroxy 1-amino propane and (10,11-dihydro [5H] dibenzo (b,f) azepinyl-5) carbonyl chloride, 5-(3'-diallylamino 2'-hydroxy propylamino carbonyl) 10,11-dihydro [5H] dibenzo (b,f) azepine is obtained.

EXAMPLE 8

Using the procedure of example 1, starting from 6g (10,11-dihydro [5H] dibenzo (b,f) azepinyl-5) carbonyl chloride and 6.40g of 3-(N-benzyl N-methyl amino) 1-amino 2-propanol, 8.85g of 5-(3'-(N-benzyl N-methylamino) 2'-hydroxy [5H] dibenzo (b,f) azepine are produced.

Thereafter, 8g of the latter are dissolved in 45 ml ethanol. 2.6g of 10% palladized charcoal and 0,5 ml concentrated hydrochloric acid are added thereto. After having expelled the air from the vessel by means of a stream of nitrogen, hydrogen is bubbled under a pressure of 50 kg/cm2 at room temperature for six hours.

Ater termination of this delay the vessel is opened, the catalyst is separated by filtration and washed many times with ethanol. The filtrates are united, discoloured by warming with activated charcoal, filtered and then evaporated to dryness. The dry residue is taken up with 50 ml N-hydrochloric acid and the clear solution is extracted twice with 10 ml ether. The organic phases are discarded. The aqueous phase is made alkaline by adding a 10% solution of sodium carbonate until pH reaches a value of 10.

5-(3'-N-methylamino 2'-hydroxypropylaminocarbonyl) 10,11-dihydro [5H] dibenzoazepine precipitates and is separated by succion. The insoluble matter is washed with water, and dried. The pure product is obtained after recristallization from 25 ml isopropylether in the hot and cooling.

6.33 g of 5-(3'-N'-methylamino 2'-hydroxypropylamino carbonyl)10,11dihydro [5H] dibenzo (b,f) azepine are recovered as white crystalls insoluble in water, soluble in the alkanols, dioxan and methylene chloride, sparingly soluble in cold isopropyl ether.

EXAMPLE 9

5-[3'-(N-tertbutyl N-benzylamino) 2'-hydroxy propyl (N''-methylamino) carbonyl] [5H] dibenzo (b,f) azepine using the same procedure as in example 1 and starting from 3-(N-benzyl N-tertbutylamino) 2-hydroxy 1-methylamino propane and [5H](dibenzo (b,f) azepinyl5) carbonyl chloride, 5-[3'-(N'-tertbutyl N'-benzylamino) 2'-hydroxypropyl N''-methylamino carbonyl][5H] dibenzo (b,f) azepine is produced with a yield of 38 per cent.

What we claim is:

1. A compound selected from the group consisting of a Tricyclic ureas of formula I

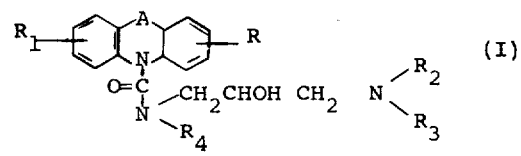

wherein

A is $-CH_2-CH_2-$, $-CH=CH-$ or $-S-$

R and $R_1$ which may be the same or different, are each hydrogen, halogen, lower alkoxy, trifluoromethyl, lower alkylthio or trifluoromethoxy, $R_4$ is hydrogen, lower alkyl or monosubstituted lower alkyl, $R_2$ is hydrogen, lower alkyl, lower alkenyl, phenyl lower alkyl or phenyl monosubstituted lower alkyl, $R_3$ is lower alkyl, monosubstituted lower alkyl, lower alkenyl, lower alkynyl, phenyl lower alkyl or phenyl monosubstituted lower alkyl, or where $R_2$ and $R_3$ are joined together there is provided a heterocycle selected from the group consisting of pyrollidine, piperidine, aziridine, hexamethyleneimine, oxazolidine, morpholine, thiazolidine, thiamorpholine, piperazine and homomorpholine, said heterocycle being substituted by from 0 to 2 lower alkyl moieties, wherein: the lower alkyl moiety is a branched or straight chain hydrocarbyl moiety of 1-6 carbon atoms, the lower alkenyl moiety is a branched or straight chain hydrocarbyl residue of one or more double bonds and having 2-10 carbon atoms, the lower alkynyl moiety is a hydrocarbon residue of 2-6 carbon atoms having one triple bond, the substituents on the substituted-lower alkyl moiety are hydroxy, lower alkoxy and di-lower alkyl amino, wherein said lower alkoxy and lower alkyl moieties contain 1-6 carbon atoms, the substituents on said substituted phenyl moiety are selected from the group consisting of methoxy, trifluoromethyl, halogen, lower alkyl, and lower alkythio, b. the physiologically tolerable acid addition thereof with a mineral or organic acid.

2. An optically active compound of claim 1.

3. dl 5-[3'-(N-benzyl N-isopropylamino) 2'-hydroxy propylamino carbonyl] 10,11-dihydro [5H] dibenzo (b,f) azepine and its hydrochloride being compounds of claim 1.

4. dl 5-[3'-N isopropylamino 2'-hydroxy propylamino carbonyl] 10,11-dihydro [5H] dibenzo (b,f) azepine and its hydrochloride being compounds of claim 1.

5. dl 5-[3'-N-tertbutylamino 2'-hydroxy propylamino carbonyl] 10,11-dihydro [5H] dibenzo (b,f) azepine and its hydrochloride being compounds of claim 1.

6. dl 5-[3'-(N-isopropyl N-benzylamino) 2'-hydroxypropyl amino carbonyl] [5H] dibenzoazepine and its hydrochloride being compounds of claim 1.

7. 10-[3'-N-tertbutylamino 2'-hydroxypropylamino carbonyl] phenothiazine and its hydrochloride being compounds of claim 1.

8. A compound of claim 1 wherein $R_2$ and $R_3$ are joined together there is provided a heterocycle selected from the group consisting of piperidine, aziridine and hexamethylene imine.

9. A compound of claim 1 wherein the substituted phenyl-lower alkyl radical is selected from the group consisting of 3, 4-dimethoxybenzyl, benzyl, m-trifluoromethylbenzyl, α-methylbenzyl, p-chlorobenzyl, phenylethyl, phenylpropyl, β-methylphenylethyl, 2,4-dichlorobenzyl, or 3,5-dimethoxy-4-methylbenzyl.

* * * * *